United States Patent [19]

Pope

[11] 4,366,348

[45] Dec. 28, 1982

[54] METHOD AND APPARATUS FOR DECODING AND PROCESSING THE INFORMATIONAL CONTENT OF MULTI-FREQUENCY SIGNALS

[76] Inventor: John W. Pope, P.O. Drawer 45246, Dallas, Tex. 75245

[21] Appl. No.: 211,851

[22] Filed: Dec. 1, 1980

Related U.S. Application Data

[63] Continuation of Ser. No. 85,876, Oct. 18, 1979, abandoned, which is a continuation of Ser. No. 20,230, Mar. 12, 1979, abandoned, which is a continuation of Ser. No. 848,767, Nov. 3, 1977, abandoned.

[51] Int. Cl.$^3$ .......................................... H04M 11/00
[52] U.S. Cl. .............................. 179/84 VF; 179/2 DP
[58] Field of Search ............ 179/84 VF, 2 DP, 2 EC, 179/2 A, 5.5, 6.01, 6.03, 6.07; 328/13 B; 340/171 R

[56] References Cited

FOREIGN PATENT DOCUMENTS

2237631 4/1973 Fed. Rep. of Germany ... 179/2 DP

*Primary Examiner*—Joseph A. Popek
*Attorney, Agent, or Firm*—Gerald L. Lett

[57] ABSTRACT

An apparatus and method are described for receiving multi-frequency tone signals, such as those which are now being utilized in telephone systems, and for deriving the informational content available from such signals in such a way as to permit storage of that information for subsequent selective retrieval. The multi-frequency signals are received from, for example, a computer operated electronic telecommunication switching system, and, for example, they have originated at the tone-generating keyboard of a telephone. Detection apparatus responsive to the frequency content of the signals produces output signals corresponding to the specific frequencies received, and these output signals are converted into digital signals of corresponding values, which digital signals have a coding form corresponding to the specific form of the digital network involved. A storage device is provided for receiving the digital signals and storing them in a selected location. The stored digital signals may be selectively read by, for example, a telephone subscriber, and the signals so read are displayed on a visual display device or the like.

10 Claims, 10 Drawing Figures

METHOD AND APPARATUS FOR DECODING AND PROCESSING THE INFORMATIONAL CONTENT OF MULTI-FREQUENCY SIGNALS

This is a continuation of application Ser. No. 85,876, filed Oct. 18, 1979, now abandoned, which is a continuation of application Ser. No. 20,230, filed Mar. 12, 1979, now abandoned, which is a continuation of application Ser. No. 848,767, filed Nov. 3, 1977, now abandoned.

BACKGROUND OF THE INVENTION

This invention relates to a method and apparatus for decoding and deriving informational content from multi-frequency signals, and more particularily, in addition to deriving the informational content from those signals the invention relates to method and apparatus for storing signals corresponding to the information contained in the digital signals and selectively retrieving those stored signals.

It has become known in the art to utilize pulse signals having differing frequency contents for the purpose of conveying information and providing operating signals in telecommunications networks and the like. More particularily, it has become known to use such pulses or tone signals for the purpose of conveying numerals selected by a telephone subscriber to a switching system and causing the switching system to be operated to connect the called subscriber indicated by those numerals. While these tone signals are most frequently used for facilitating switching operations, it is quite clear that the generation of combinations of them at a subscriber station can be a way of causing the transmission of information over the same system after completion of a connection in a relatively inexpensive and uncomplicated manner.

It is, therefore, an object of this invention to provide a method and apparatus whereby one party, i.e., a called party, can selectively receive the aforementioned multi-frequency or tone signals following completion of a connection to him, derive informational content from those signals, store signals corresponding with the latter information and selectively retrieve the stored informational signals.

An additional object of the invention is to provide the method and apparatus defined above wherein the multi-frequency signals are received only when desired, such as after a predetermined period of time has elapsed after the connection is completed.

A further object of this invention is to provide a method and apparatus as set forth in the foregoing objects which are capable of being utilized either on a centralized or an individual station basis.

BRIEF DESCRIPTION OF THE DRAWINGS

The foregoing and other objects are achieved in a method and apparatus according to the principles of the invention, a preferred form of which is described in detail hereinbelow in conjunction with the drawings which are described briefly as follows.

DETAILED DESCRIPTION OF THE PREFERRED EMBODIMENT

Figure 1:
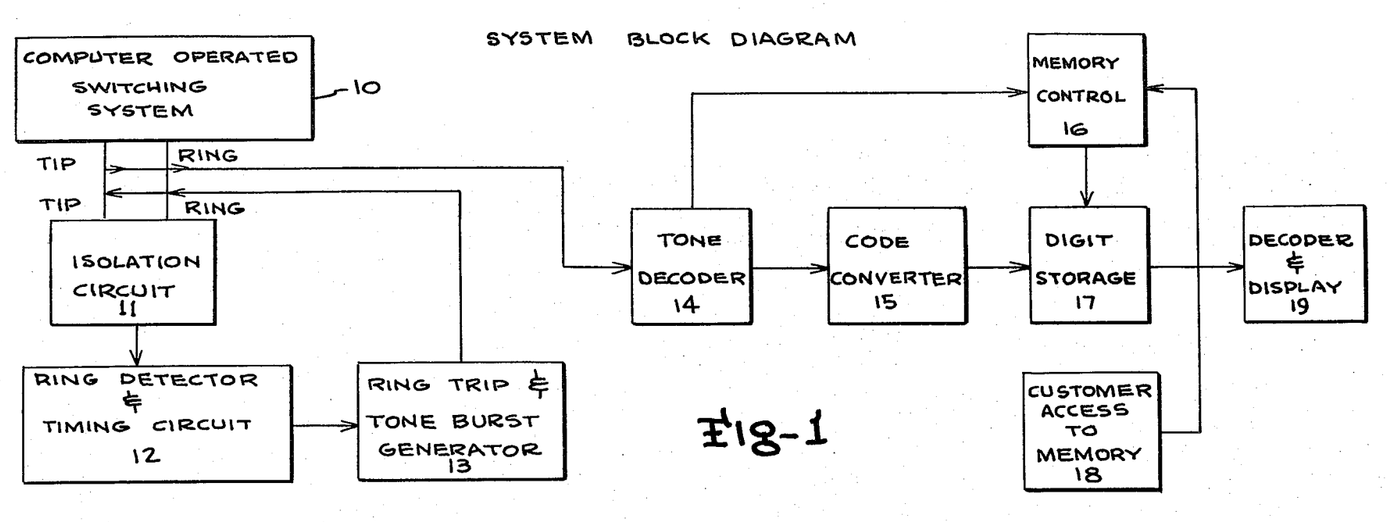
FIG. 1 is a block diagram of a preferred embodiment of a system constructed according to the principles of the invention and operating according to the method of the invention.

FIG. 1 in block diagram form illustrates the structural arrangement and operation of an exemplary system operating according to the principles of the invention.

The illustrated system is connected to operate directly with a centrally controlled or computer operated telephone switching system such as, for example, the ESS-1 manufactured by Western Electric Company. However, it is to be noted that other switching systems capable of processing multifrequency signals or other sources of signals to be decoded and processed in the manner to be described below can be used. Moreover, while a wire-connected telephone circuit is shown as being connected to the inventive system, it is to be remembered that it is contemplated that the system described herein can be used in conjunction with a variety of forms of transmission at a variety of frequencies. The particular switching system form is exemplary and forms no part of the invention. Accordingly, it is not described in detail herein.

The remainder of the circuitry illustrated in FIG. 1 forms the system of the invention and can be a system constructed to be used at a central location servicing a number of subscribers, or individual embodiments of the invention can be utilized on an individual basis. A further alternative can be the provision of certain of the components on an individual subscriber basis while providing centralized memory facilities.

In FIG. 1 isolation circuit 11 receives ringing signals from the switching system 10 and performs the function of electrically isolating the incoming lines from the switching system from the system described herein. As will be described in greater detail hereinbelow, the isolation circuit is preferably in the form of an optical coupler capable of electrically isolating one circuit from another.

The output from isolation circuit 11 is then coupled to a detector and timing circuit 12 which performs the function of monitoring the number of ringing signals transmitted to the called station. As will be described hereinbelow, the number of times a ringing signal will be permitted to occur prior to the system described herein being activated is variable by the subscriber.

When the predetermined number of ringing signals has occurred, an output is emitted from detector and timing circuit 12 to a ring trip and tone burst generator circuit 13. Essentially, this circuit performs the function of recognizing a subscriber's intention of answering an incoming call, or should the latter not be the case, it connects tone decoder circuit 14 to the incoming line to receive tone frequencies emitted from the switching system or from any other source.

Tone decoder 14 is constructed in the manner to be described in greater detail hereinbelow to detect and decode bursts of dual frequency tones such as are used for tone frequency signalling in conventional telephone networks. That is, for each digit of a number being dialed, a different dual frequency tone is produced. Obviously other forms of tone frequency signalling than that specifically used in connection with telephone networks can be used in conjunction with this invention. Thus, decoder 14 might be constructed in any of a number of known ways to detect and decode signals at other frequency levels in dependence on the specific mode of transmission used.

The tone decoder 14 produces two forms of outputs, one of which goes to a memory control 16 and the other being coupled to a code converter 15. Code converter 15 operates to decode the information received from tone decoder 14 in whatever form and convert it to a known binary code, such as binary coded decimal (BCD). The other forms of output from the tone detector 14 which is identified below as a strobe signal, as well, initiates operation of a counter in the memory control 16 for the selection of a given location in the memory, and an indication of the number of digits of information to be stored is provided.

Digit storage 17 receives the digital information produced by code converter 15 and stores it in the selected location for later access as will be described.

A subscriber storage access identified as a customer access to memory 18 is provided for allowing a subscriber to select a predetermined location in the memory, have the contents read therefrom and if desired erase those contents. The memory involved is a random access memory, and therefore, any location can be selected at will.

The contents of the selected location in storage 17 are supplied to a decoder and display circuit 19 which receives the digital information from the memory, decodes it in accordance with the particular form of digital information used and converts it for driving a display. The display can be of any suitable form, such as light emitting diodes.

Figure 2:
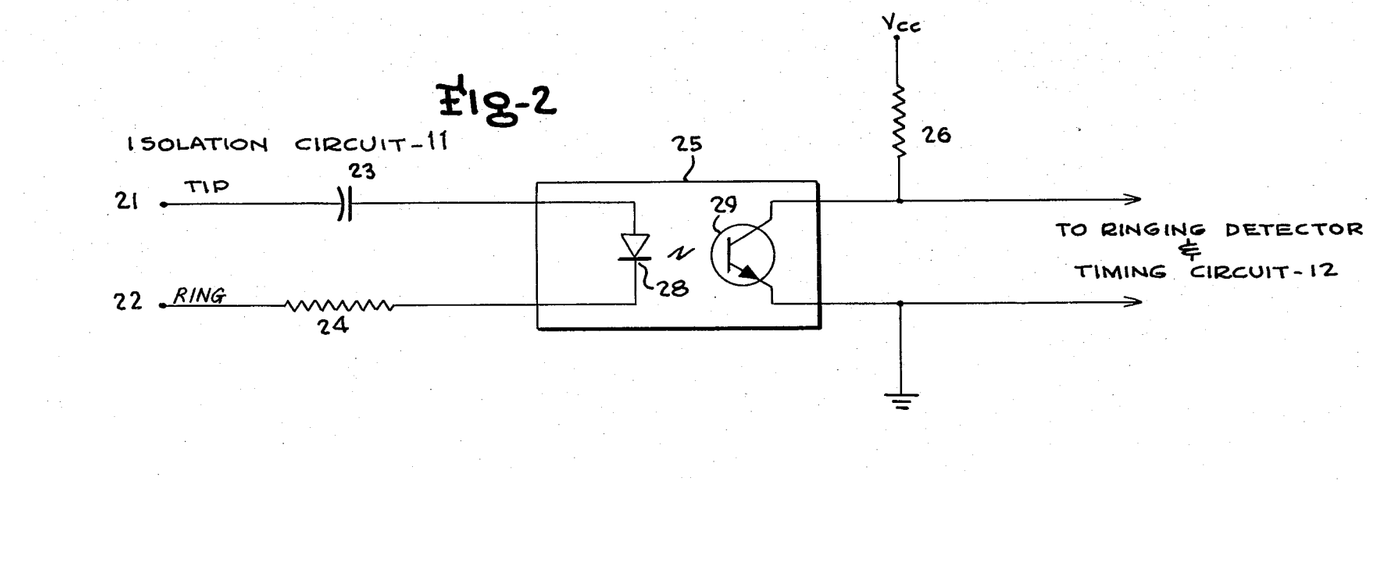
FIG. 2 is a schematic diagram of a preferred embodiment of an isolation circuit as used in the FIG. 1 system.

FIG. 2 is a detailed schematic diagram of a preferred form of isolation circuit 11 which utilizes optical coupling principles. The tip and ring lines 21 and 22, respectively, convey the ringing signals from switching system 10 and couple them to an optical coupler 25 through capacitor 23 and resistor 24. An optical source 28, such as a light emitting diode, receives the signal and optically communicates it in a known manner to a phototransistor 29. The phototransistor responds in the usual manner and produces a corresponding voltage signal which appears across resistance 26. The specific optical coupler used in this preferred embodiment is manufactured by Monsanto Inc. and has a type designation MCT1.

The output from isolation circuit 11 appearing across resistance 26 is coupled to the ring detector and timing circuit 12. The latter is illustrated in detail in FIG. 3.

Figure 3:
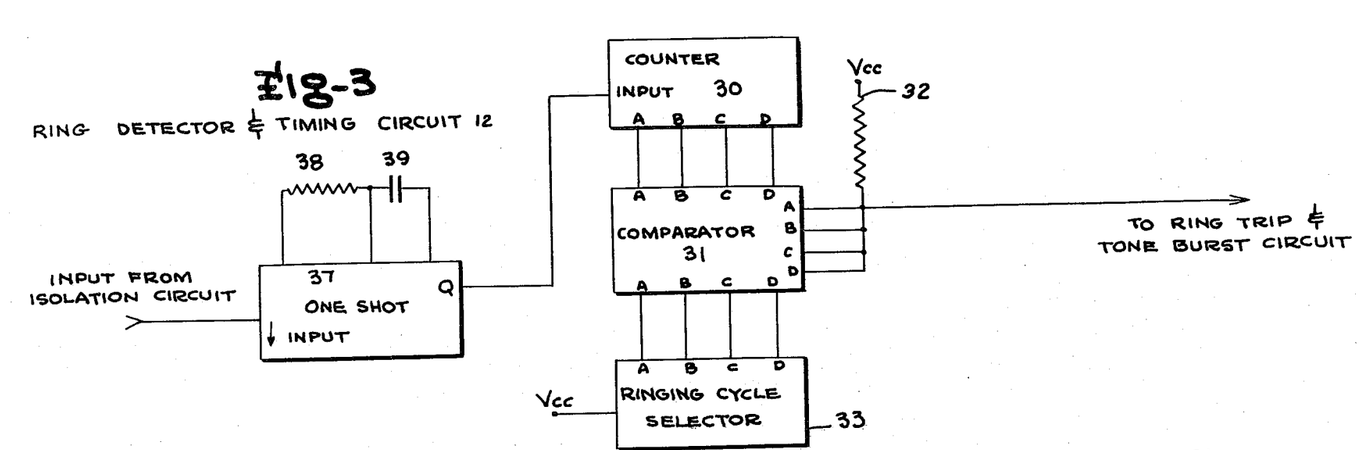
FIG. 3 is a block-schematic diagram of a preferred embodiment of a ring detector and timing circuit as used in the FIG. 1 embodiment.

The signal received from isolation circuit 11 is applied to a multi-vibrator 37 commonly known as a one-shot multi-vibrator. In the preferred embodiment this multi-vibrator may be constructed as an integrated circuit, the circuit used herein is manufactured by Motorola Inc., and has a type designation SN-74122. Resistor 38 and capacitor 39 in the conventional manner form a timing circuit which can be preset to cause the multi-vibrator to produce an output at a given time responsive to reception of an input signal from the isolation circuit.

The output from multi-vibrator 37 is coupled to an input of a multi-stage digital counter 30. Counter 30 is in the preferred embodiment constructed in integrated form and preferably a binary counter circuit, manufactured by Texas Instruments and having type designation SN-7490 is used. In the conventional manner, this counter produces four parallel outputs labeled herein A through D corresponding to the states of each of the stages.

A binary coded cycle selector 33 which may be constructed in any desired form provides a preselected digital output in parallel form corresponding to the preselected number of ringing signals to be received before the system of the invention is to be initiated.

The parallel outputs from counter 30 and selector 33 are applied, respectively, to inputs of digital comparator 31. This digital comparator may be constructed in integrated circuit form, and in the preferred embodiment herein a Signetics Inc, N8242 comparator circuit is used. When counter 30 has been advanced by multi-vibrator 37 to produce a parallel digital output corresponding to the digital output from cycle selector 33, an output from comparator 31 will be produced which appears across resistance 32. The latter output may be in the form of a pulse.

Figure 4:
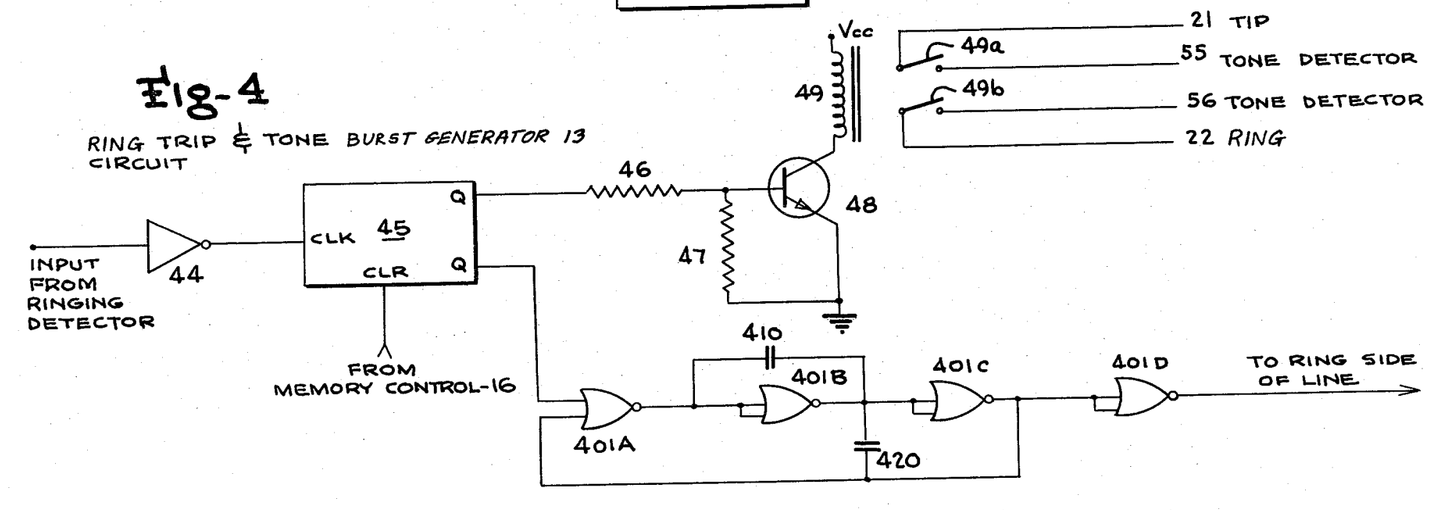
FIG. 4 is a block-schematic diagram of a preferred embodiment of a trip and tone burst generator circuit as is used in connection with the FIG. 1 system.

FIG. 4 is a detailed schematic diagram illustrating the construction of a preferred form of ring trip and tone burst generator circuit 13. As indicated, this circuit receives the pulse produced across resistance 32 in detector and timing circuit 12, and this pulse is applied to an inverter 44. The inverted input is applied to a clock terminal of a conventional JK flip flop circuit 45. Again, this circuit is constructed using integrated circuit techniques in this preferred embodiment, and the specific circuit used is manufactured by Motorola Inc., and has the type designation SN-7473. When the output from the inverter yields a negative transition, as will be the case when there is an output from the circuit 12, output Q will produce a relatively higher output signal and output $\bar{Q}$ will produce a relatively lower valued output signal. The latter lower valued output signal at $\bar{Q}$ is applied to a series connection of Nor gates 401A–D. As indicated, and referring to FIG. 1, the output from these Nor gates is returned to the ring line issuing from switching system 10. These Nor gates function as a tone burst generator in the known manner with a frequency of operation being determined by the values of capacitors 410 and 420. The tone burst issuing from Nor gate 401-D is coupled to the ring side of the incoming line, and this has the effect of signalling the calling party that the system is ready to accept tone signalling information from the calling party's telephone or from some other source of a tone signal.

Figure 5:
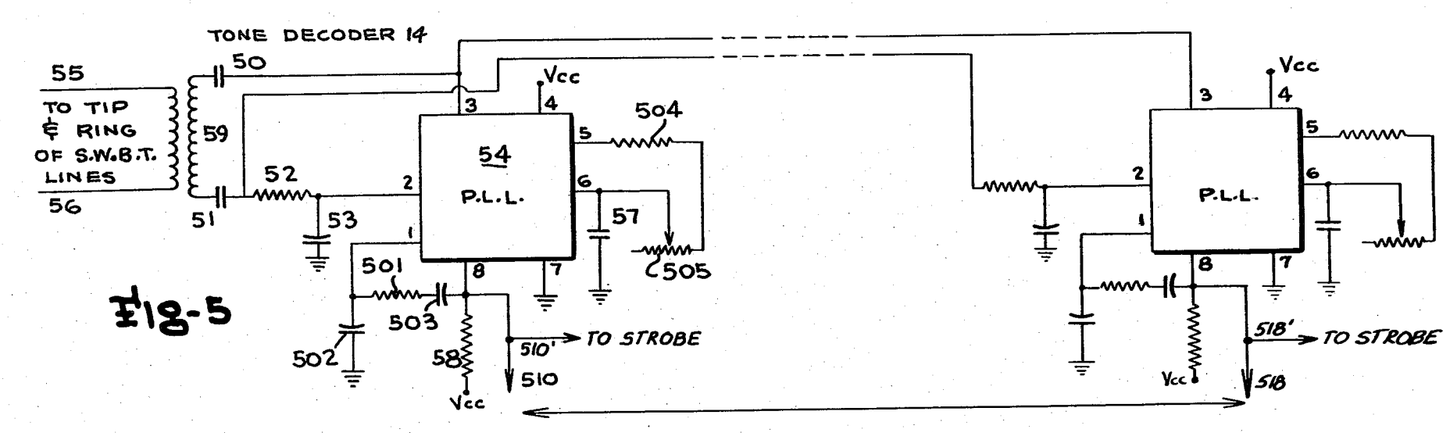
FIG. 5 is a schematic diagram of a tone decoder as used in connection with the FIG. 1 system.

When output Q from flip flop 45 switches to a logic 1, the output signal will be supplied through voltage divider 46–47 to a transistor 48. This transistor is turned on, and this actuates relay 49. Relay 49 operates to close contacts 49A and 49B thereby connecting tip and ring lines 21 and 22 to lines 55 and 56 which as will be seen in FIG. 5 are connected to inputs of tone decoder 14. At this point, the tone decoder 14 is ready to receive tone signalling information from the calling party.

A preferred form of construction for tone decoder 14 is illustrated in FIG. 5. For each digit being transmitted, the tone decoder receives two frequencies and from these, in the known manner, produces a corresponding output using tuned phase-locked loops. The latter function as filters to select the various frequencies constituting the tone signal.

More particularly, upon command as indicated hereinabove, the tone signals are supplied by output lines 55 and 56 to a transformer 59 in the tone decoder. These tone signals are then supplied in parallel to a plurality of phase-locked loop circuits 54. Each of the latter are constructed as integrated circuits, and in the preferred embodiment described herein a Signetics Inc., circuit having the type designation NE-567 is used for each circuit. Although not specifically illustrated in FIG. 5 a total of nine phase-locked loop circuits are used in this embodiment, but the number selected depends on the expected frequency content of the tone signals.

Capacitors 50 and 51 along with the resistor capacitor combination 52 and 53 for each phase-locked loop circuit provide DC isolation paths to each of the circuits 54. The frequency to which each phase-locked loop circuit is tuned and the frequency it thereby passes is determined by preselected values for resistor 504, capacitor 57 and potentiometer 505. The tuned bypass for the phase-locked loop is formed by resistors 58 and 501 and capacitors 502 and 503. The construction and arrangement for each of the phase-locked loop circuits is identical, and is well known.

In accordance with the frequencies present for a given tone corresponding to a given digit, a certain one or more of the phase-locked loop circuits produce an output, and these outputs then appear in the known manner on the output lines 510 through 518.

As described hereinabove, two forms of outputs are available from the tone decoder output lines. When an output appears at one or more of the outputs 510 through 518, a corresponding wave form appears at parallel output terminals 510′ through 518′. As indicated, these parallel outputs are connected in parallel to the strobe line 519. Thus, as an output signal or signals appear at the tone decoder outputs, they are supplied as well to the strobe line as strobe signals; the decoded outputs, in fact, serve as the strobe signals. The signals so obtained from decoder 14 sequentially advance counter 196 (FIG. 7) in memory control 16. This has the effect of causing the selection of a storage location for a given digit. As each digit is decoded in tone decoder 14, it "strobes" the counter 196 so as to cause the memory control to advance to the next storage location in the memory for storing the next digit in the sequence being decoded.

Information in the foregoing form is clearly not suitable for storage in conventional digital storage networks. Accordingly, conversion must be made to an acceptable digital code, such as binary coded decimal. This is accomplished by the code converter circuit 15 illustrated in detail in FIG. 6.

Figure 6:
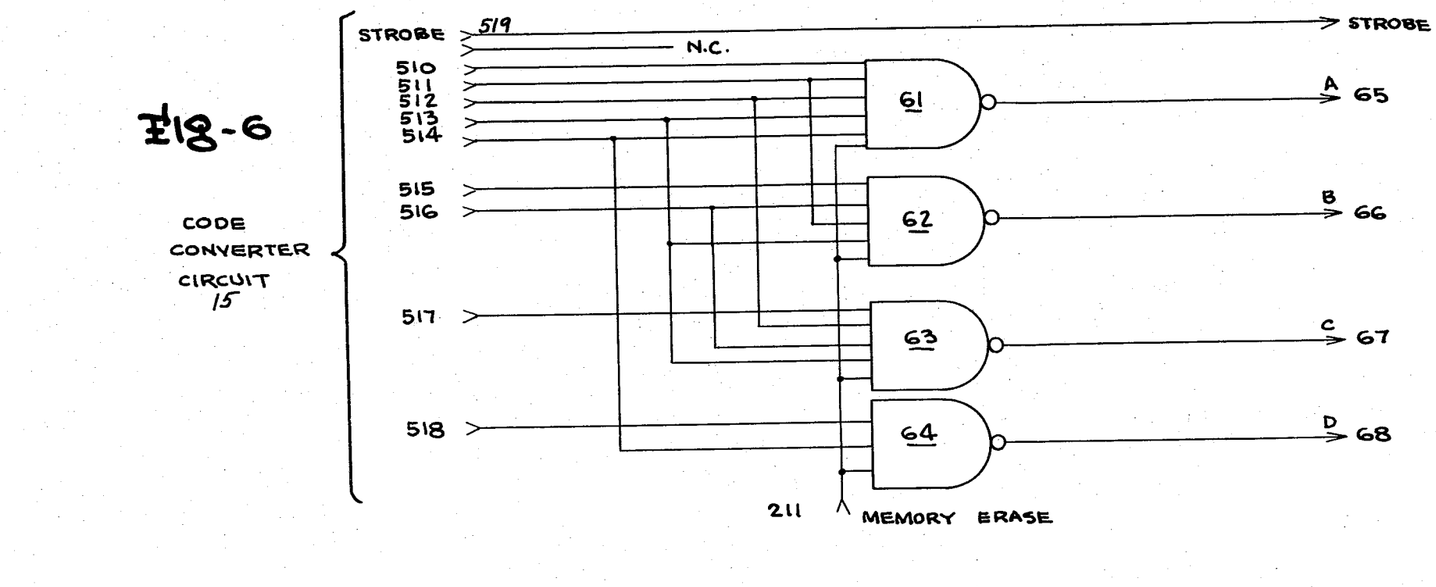
FIG. 6 is a schematic diagram of a code converter circuit as is used in connection with the FIG. 1 system.
Figure 8:
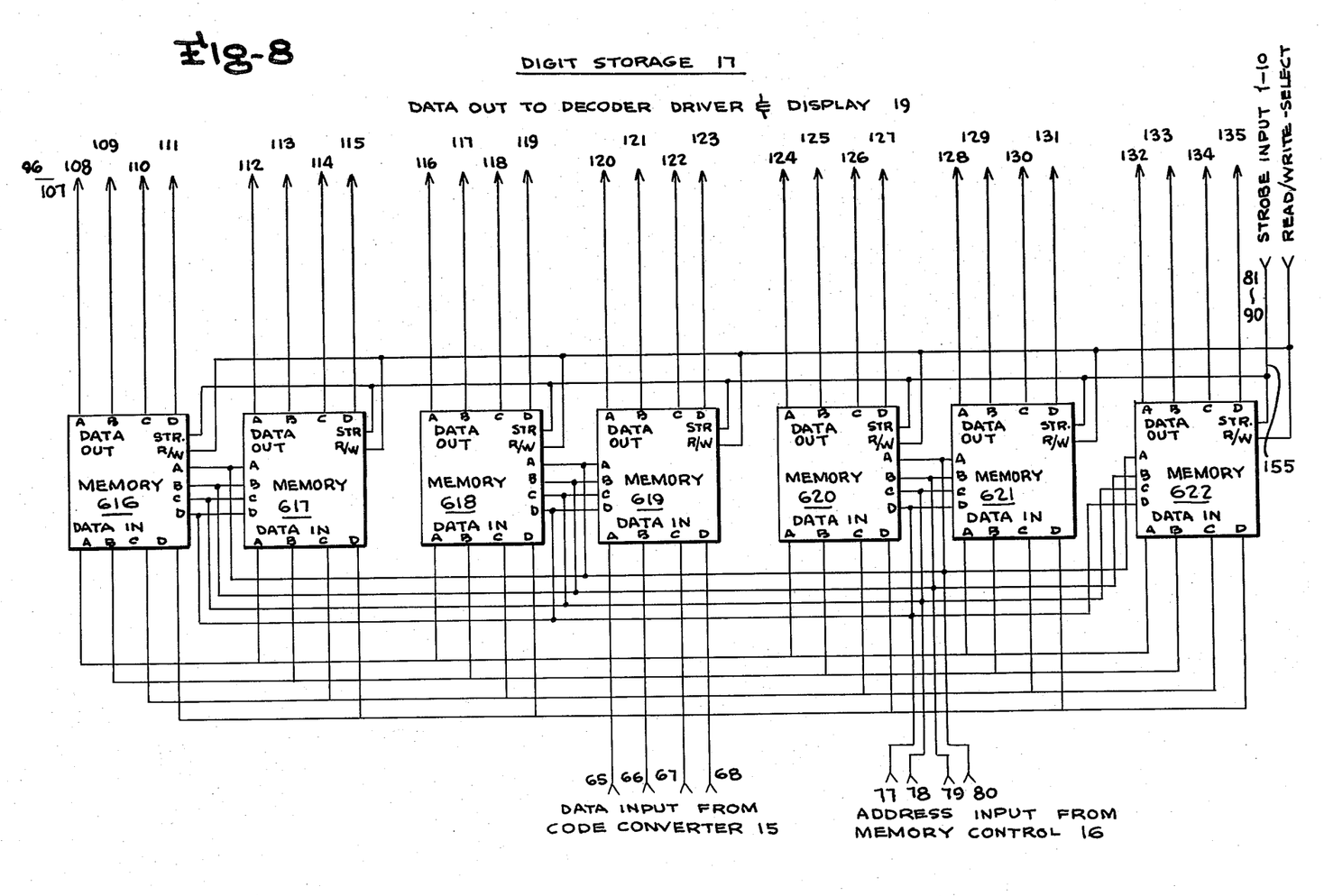
FIG. 8 is a schematic diagram of a digit storage as is used in the FIG. 1 system.

The code converter is constructed from four Nand gates. In the preferred embodiment National Semiconductor Inc. Nand gates having the type designation SN-7430 are used. The outputs from each of the phase-locked loop circuits in tone decoder 14 are connected to the various inputs of the Nand gates 61 through 64 in the combinations shown. The binary coded decimal equivalent to the input signals so applied are issued from outputs 65 through 68. The latter outputs are connected to digit storage 17 as illustrated in FIG. 8 and discussed hereinbelow.

When a given tone signal is received, detected and converted and then supplied to the inputs of digit storage 17, only one location in that storage can be enabled to accept data at any given time. This is accomplished using the memory control circuit 16.

As indicated from FIGS. 5 and 6, a strobe input signal is supplied from tone decoder 14 to sequentially advance a multistage binary counter 196 in memory control 16. This selects the first storage location in which the first digit will be placed. The second digit is received into a second location by reason of the fact that the strobe input has advanced the counter to a second step and so on.

Figure 7:
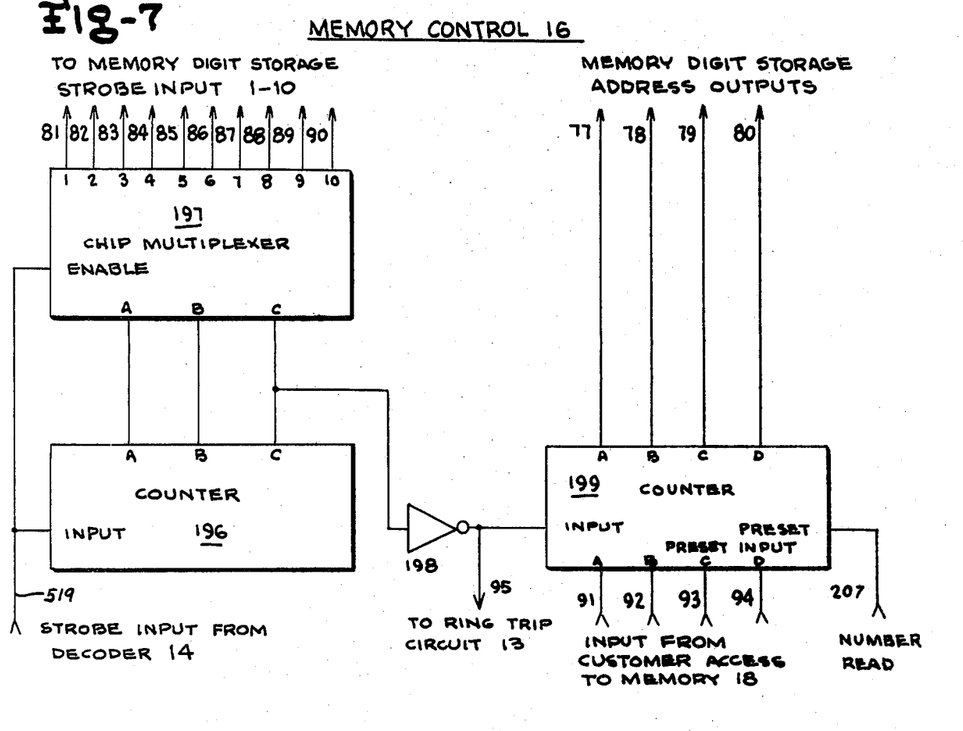
FIG. 7 is a schematic diagram of a memory control circuit as is used in connection with the FIG. 1 system.

More particularly, the outputs from counter 196, which is a Texas Instruments SN-7490 integrated circuit counter, are supplied to a conventional multiplexer 197. This multiplexer, preferably a Motorala SN-74154 circuit, in the conventional manner supplies strobe inputs 1 through 10 (FIG. 8) for selecting appropriate storage locations for the input digits. Inputs 91 through 94 receive digital signals from subscriber access 18 which is described in greater detail below. These are the signals which indicate the specific memory location desired to be accessed and read by the subscriber. This information is supplied to counter 199 which in turn produces parallel digital outputs 77 through 80 to indicate to the digit storage which location has been selected by the subscriber to be read out.

Inverter 198 produces a signal coupled through line 95 to the above-described trip and tone burst generator circuit 13. This will have the effect of resetting the flip flop 45 therein to disconnect the tone decoder from the input line.

As illustrated in detail in FIG. 8, digit storage 17 is primarily constituted by a plurality of storage units 616 through 622. In the preferred embodiment, each of these are formed from a memory circuit manufactured by Motorola Inc. and having type designation SN-7489.

In the storage, the strobe inputs are supplied on line 155, and these select the specific memory location in accordance with known principles. The memory location so chosen receives data from code converter 15 on lines 65 through 68.

When a given storage location is to be accessed, the address of that location is received on lines 77 through 80 from memory control 16. The storage location so selected produces a BCD output in accordance with the coding used in this example on one of the sets of output lines indicated as 108 through 135. These outputs are, respectively, supplied to the decoder and display circuit 19 to be described more fully hereinbelow.

Figure 9:
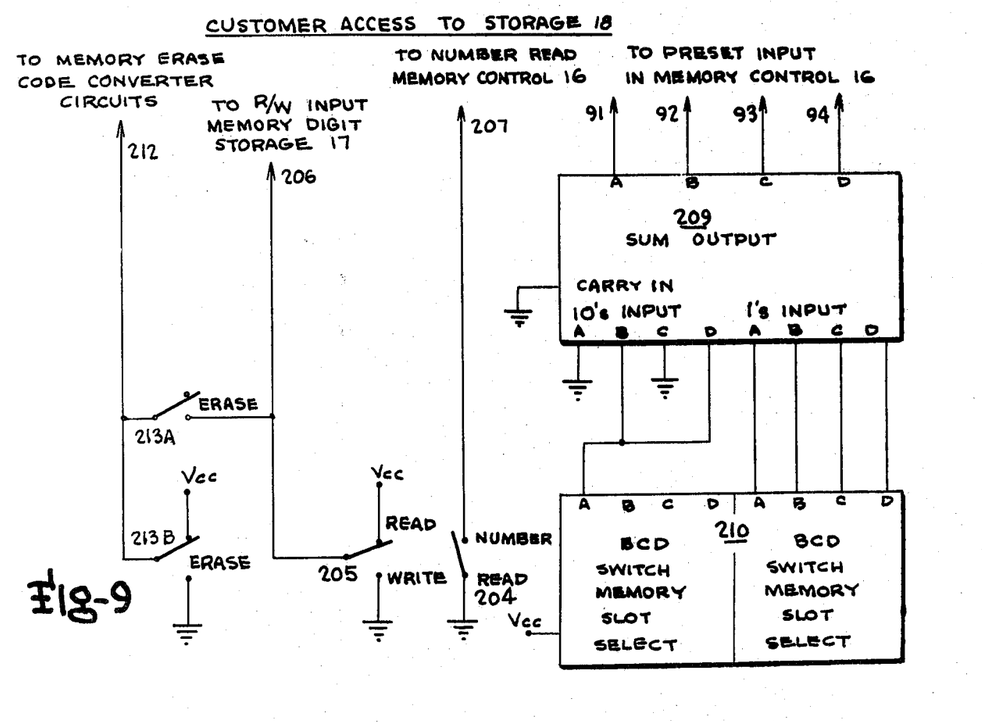
FIG. 9 is a schematic diagram of the customer access to the storage circuitry as is used in connection with the FIG. 1 system.

FIG. 9 illustrates in schematic form the customer access to memory 18. When a subscriber desires to read information from a given location in digit storage 17, he operates storage access 18 in order to select the desired storage location. As is clear from the discussion hereinabove, digit storage 17 is a random access memory so that the subscriber has access to any desired location in order to read the information therefrom. In addition to the selection of a storage location certain other functions are manually selectible on storage access 18.

In order to select a given storage location, the subscriber operates the two BCD select switches 210 which are of conventional construction and need not be described further herein. The outputs from switches 210 are supplied to a 4-bit binary adder 209 which in this exemplary embodiment is constructed from a Motorala type SN-7483 integrated circuit. The outputs from the BCD switches are combined into a true binary form and then coupled to memory control 16 by output lines 91 through 94. Memory control 16 operates in the manner described hereinabove to select the desired location in digit storage 17 on the basis of the signal content of lines 91 through 94.

Following selection of a storage location, switch 205 is operated to supply a voltage through line 206 to read-write inputs of each of the storage units 616 through 622. In this embodiment the read function is selected by a given voltage level while the write function is selected by operating the switch to a ground voltage level. In order to read information from the selected storage location, switch 204 must be operated to supply a ground voltage level to the storage units so that information from selected storage will be supplied to the output lines connected thereto. In order to erase information from a selected storage location, switch 213 is operated to supply the indicated voltage via line 212 to perform the erasing function. Operation of the latter switch has the effect of supplying a binary zero to the selected storage location.

As discussed, customer access to memory or storage access 18 allows a subscriber to select a given location in the storage and have the numerical information in that location displayed. It was described hereinabove that when a given storage location is selected for having information read therefrom, that information is supplied, in this example, to the four output lines connected to the selected location. For example, if storage 616 were selected, the selected contents would be supplied in BCD form on outputs 108 through 111. This is similarly true for each of the other storage units and combinations of them. The outputs from these storage units are coupled to decoder and display circuit 19 illustrated in greater detail in FIG. 10.

Figure 10:
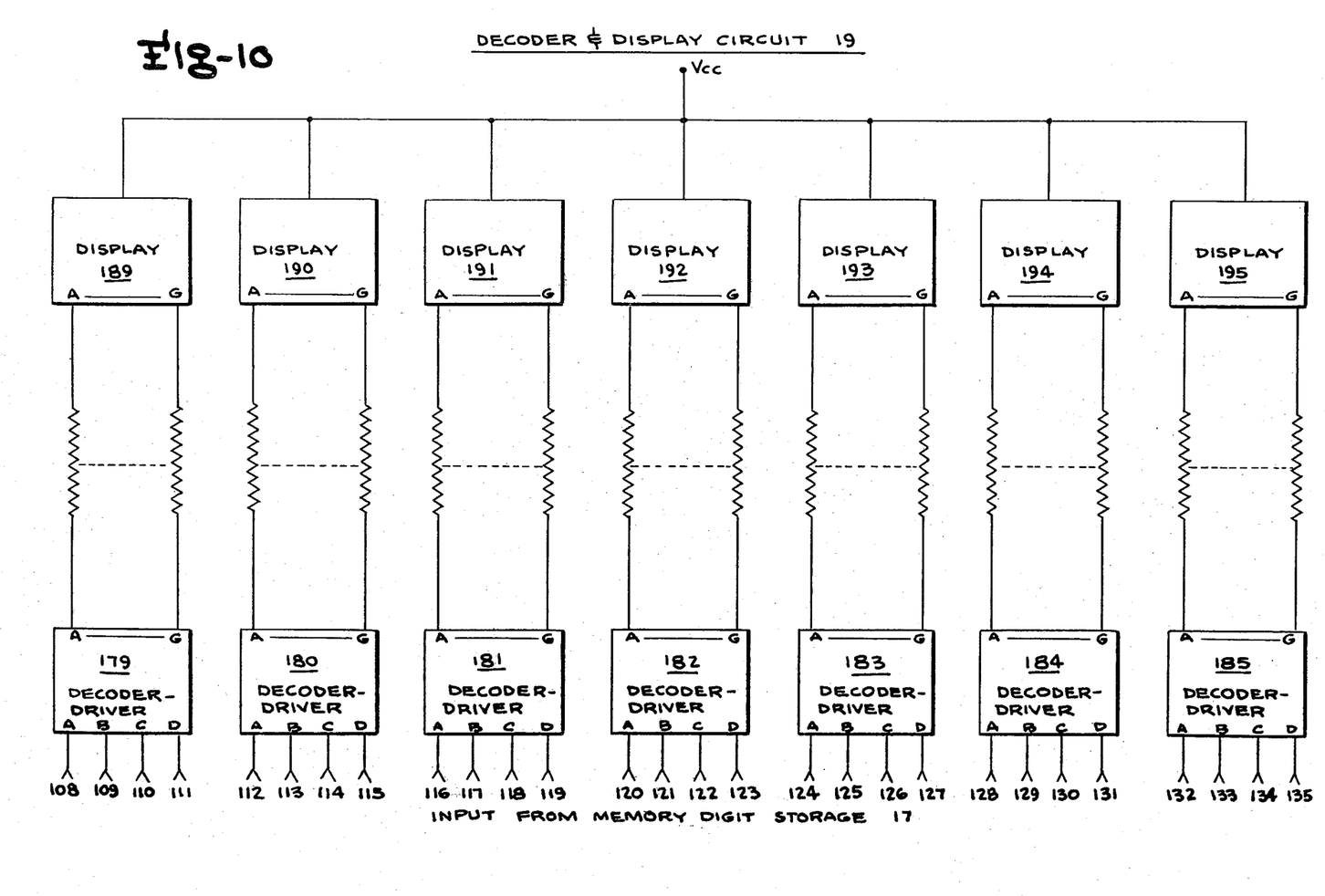
FIG. 10 is a schematic diagram of a decoder and display network as is used as the output of the FIG. 1 system.

In FIG. 10 it can be seen that the outputs from the locations in digit storage 17 are supplied, respectively, to decoder driver units 179 through 185. In this embodiment each of these units is constructed in integrated form using a Texas Instruments type SN-7447 circuit. The outputs from each of the decoder drivers are supplied, respectively, to numerical visual displays 189 through 195. The latter in this embodiment are light emitting diodes and are constructed from such diodes manufactured by Texas Instruments Inc. and having the designation TIL-302. Thus, the BCD information stored in digit storage 17 is converted in circuit 19 to electrical signals which can be utilized by the various digit displays to provide a visual readout of the numerical information stored in the selected storage location.

An apparatus for tone frequency decoding storage of the decoded information and selective retrieval of that storage information is described hereinabove. It is contemplated that the tone signals to be decoded can come from any source, not only a telephone switching network. Many forms of data transmission can provide pulses of the type and frequency being processed in the system of this invention. Accordingly, it is contemplated that whatever form of data communication might utilize signals of this type, this invention may be used with that form of communication. For example, these signals may be pulse modulated, high frequency signals emanating from satellites or may take an optical form as from lasers and be communicated via light fiber conductors.

It is to be remembered that the system and its components described hereinabove are only exemplary, and it is contemplated that the described embodiments can be modified or changed in a variety of ways known to those skilled in the art. Such modifications and changes do not depart from the spirit and scope of the invention as defined by the appended claims.

I claim:

1. Apparatus for receiving information bearing multi-frequency pulse signals, for decoding the received signals and for storing information, so decoded, in one of a plurality of storage locations, for selective retrieval, comprising:
    means for receiving the multi-frequency pulse signals,
    frequency selective detector means responsive to the frequency content of the received multi-frequency pulse signals for producing output signals corresponding to the individual frequencies of the multi-frequency pulse signals,
    converter means for producing digital signals corresponding to the values of the outputs from said frequency selective detector means,
    storage means having a plurality of storage locations for receiving and storing said digital signals,
    storage control means responsive to the outputs from said frequency selective detector means for selecting locations in said storage means, said digital signals being coupled to said locations,
    storage access means for selectively addressing, via said storage control means, a desired one of said storage locations in said storage means for selectively reading information from, writing information in or erasing information from said desired location and
    read-out means for receiving the information from said storage means and producing intelligible indications of the information.

2. The apparatus defined in claim 1 further comprising:
    actuating means for initiating the operation of said means for receiving after the expiration of a manually selectible period of time as determined from a corresponding number of ringing signals.

3. The apparatus defined in claim 2 further comprising:
    means for producing an indicating signal upon operation of said actuating means.

4. The apparatus defined in claim 3 further comprising:
    means for communicating said indicating signal to the location from which said multi-frequency pulse signals emanate.

5. The apparatus defined in claim 1 wherein said frequency selective detector comprises:
    a plurality of filter circuits connected in parallel, each filter circuit being tuned to pass one of the frequencies forming the pulses and
    a plurality of parallel outputs, each output being coupled to a respective filter circuit output, for producing the output signals corresponding to the frequencies forming each pulse.

6. The apparatus defined in claim 5 wherein said filter circuits are phase locked loop circuits.

7. The apparatus defined in claim 1 wherein said storage means is a random access memory.

8. The apparatus defined in claim 1 wherein said read out means comprises visual display means having visual indicators and means for converting said received information from said storage means into signals for operating said visual indicators.

9. A method for receiving information bearing multi-frequency pulse signals, for decoding the received signals and for storing information, so decoded, for selective retrieval, comprising the steps of:
  receiving multi-frequency pulse signals,
  converting said received multi-frequency pulse signals into digital signals having values corresponding to the frequency content of each said multi-frequency pulse,
  selecting predetermined locations in a storage means for storing said digital signals,
  storing said digital signals,
  manually supplying information for addressing desired locations in the storage means and
  reading information from an addressed storage location.

10. The method defined in claim 9 comprising the additional step of:
  visually displaying information read from a said addressed storage location.

* * * * *

US004366348C1

(12) REEXAMINATION CERTIFICATE (4345th)
United States Patent
Pope (10) Number: US 4,366,348 C1
(45) Certificate Issued: May 15, 2001

(54) METHOD AND APPARATUS FOR DECODING AND PROCESSING THE INFORMATION CONTENT OF MULTI-FREQUENCY SIGNALS

(75) Inventor: John W. Pope, Dallas, TX (US)

(73) Assignee: Cidco, Incorporated, Morgan Hill, CA (US)

Reexamination Request:
No. 90/005,544, Nov. 3, 1999

Reexamination Certificate for:
Patent No.: 4,366,348
Issued: Dec. 28, 1982
Appl. No.: 06/211,851
Filed: Dec. 1, 1980

Related U.S. Application Data (63) Continuation of application No. 06/085,876, filed on Oct. 18, 1979, now abandoned, which is a continuation of application No. 06/020,230, filed on Mar. 12, 1979, now abandoned, which is a continuation of application No. 05/848,767, filed on Nov. 3, 1977, now abandoned.

(51) Int. Cl.[7] .................................................. H04M 11/00
(52) U.S. Cl. ...................................... 340/825.73; 379/386
(58) Field of Search ........................ 340/825.71, 825.73; 379/93.18, 93.26–93.28, 102.01–102.03, 67.1, 68, 74, 376, 386, 142

(56) References Cited

U.S. PATENT DOCUMENTS

| Re. 31,789 | 1/1985 | Hashimoto ............................ 379/142 |
| 3,131,259 | 4/1964 | Di Iorio et al. . |
| 3,359,369 | 12/1967 | Di Iorio et al. . |
| 3,564,509 | 2/1971 | Perkins et al. . |
| 3,604,854 | 9/1971 | Jacobaeus et al. ..................... 179/5.5 |
| 3,614,329 | 10/1971 | Topfer et al. .......................... 179/18 |
| 3,684,834 | 8/1972 | Bryant, Jr. .............................. 179/6 |
| 3,686,440 | 8/1972 | Kroeger . |
| 3,727,003 | 4/1973 | Paraskevakos . |
| 3,787,626 | 1/1974 | Subieta . |
| 3,787,632 | 1/1974 | Male et al. ............................. 179/18 |
| 3,792,203 | 2/1974 | Martin .................................... 179/90 |
| 3,806,664 | 4/1974 | Bowen et al. . |
| 3,846,783 | 11/1974 | Apsell et al. ........................ 340/311 |
| 3,862,374 | 1/1975 | Evers .................................... 179/18 |
| 3,864,522 | 2/1975 | DeKozan et al. . |
| 3,870,821 | 3/1975 | Steury . |
| 3,904,830 | 9/1975 | Every, Sr. et al. . |

(List continued on next page.)

FOREIGN PATENT DOCUMENTS 2 237 631   4/1973   (DE) .

Primary Examiner—Wing F. Chan (57) ABSTRACT

An apparatus and method are described for receiving multi-frequency tone signals, such as those which are now being utilized in telephone systems, and for deriving the informational content available from such signals in such a way as to permit storage of that information for subsequent selective retrieval. The multi-frequency signals are received from, for example, a computer operated electronic telecommunication switching system, and, for example, they have originated at the tone-generating keyboard of a telephone. Detection apparatus responsive to the frequency content of the signals produces output signals corresponding to the specific frequencies received, and these output signals are converted into digital signals of corresponding values, which digital signals have a coding form corresponding to the specific form of the digital network involved. A storage device is provided for receiving the digital signals and storing them in a selected location. The stored digital signals may be selectively read by, for example, a telephone subscriber, and the signals so read are displayed on a visual display device or the like.

U.S. PATENT DOCUMENTS

| | | | |
|---|---|---|---|
| 3,914,555 | 10/1975 | Comas et al. | 179/18 |
| 3,920,908 | 11/1975 | Kraus . | |
| 3,976,995 | 8/1976 | Sebestyen | 340/337 |
| 3,988,550 | 10/1976 | Ts'ao | 179/90 |
| 3,997,732 | 12/1976 | Every, Sr. et al. . | |
| 4,008,380 | 2/1977 | La Borde | 179/90 |
| 4,011,434 | 3/1977 | Hockler | 235/61.9 |
| 4,039,761 | 8/1977 | Nicoud et al. | 179/90 |
| 4,044,206 | 8/1977 | Champan et al. | 179/84 |
| 4,049,915 | 9/1977 | Danner . | |
| 4,069,477 | 1/1978 | Maben | 340/311 |
| 4,071,699 | 1/1978 | Jovic et al. . | |
| 4,121,052 | 10/1978 | Richard . | |
| 4,197,526 | 4/1980 | Levine et al. | 340/311 |
| 4,209,667 | 6/1980 | Simokat | 179/17 |
| 4,221,935 | 9/1980 | Barsellotti et al. | 179/17 |
| 4,242,539 | 12/1980 | Hashimoto | 179/5 |
| 4,278,849 | 7/1981 | Sund | 179/175.2 |
| 4,355,210 | 10/1982 | Soulliard | 179/84 |

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–8 is confirmed.

Claims 9 and 10 are cancelled.

\* \* \* \* \*